H. R. GEER.
UNIVERSAL SHAFT COUPLING.
APPLICATION FILED DEC. 10, 1919.
1,351,420.
Patented Aug. 31, 1920.
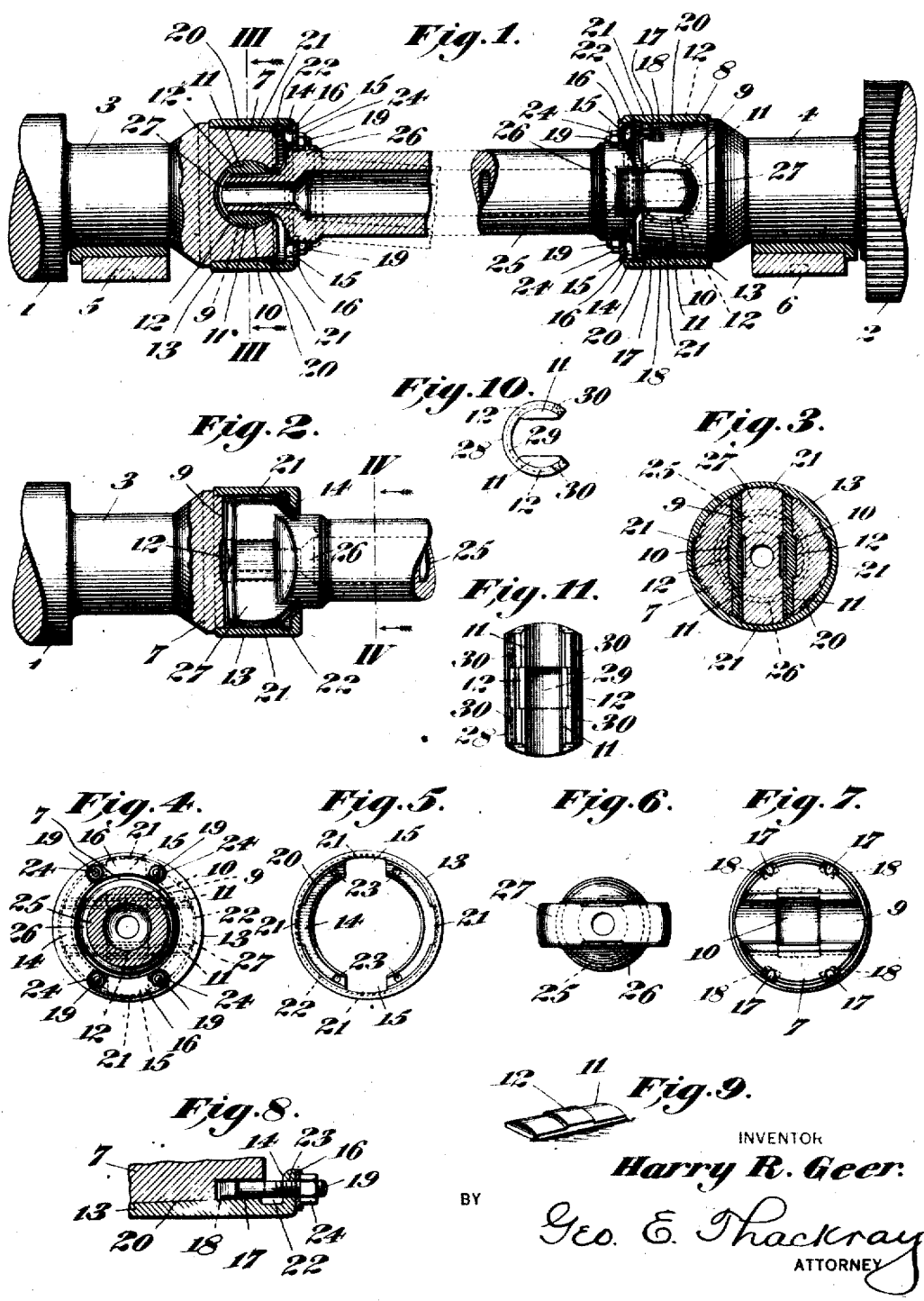
INVENTOR
Harry R. Geer.
BY
Geo. E. Thackray
ATTORNEY

UNITED STATES PATENT OFFICE.

HARRY R. GEER, OF JOHNSTOWN, PENNSYLVANIA.

UNIVERSAL SHAFT-COUPLING.

1,351,420.  Specification of Letters Patent.  Patented Aug. 31, 1920.

Application filed December 10, 1919. Serial No. 343,699.

*To all whom it may concern:*

Be it known that I, HARRY R. GEER, a citizen of the United States, and a resident of the city of Johnstown, county of Cambria, and State of Pennsylvania, have invented certain new and useful Improvements in Universal Shaft-Couplings; and I do hereby declare the following to be a full, clear, and exact description of the invention, such as will enable others skilled in the art to which it appertains to make and use the same.

My invention relates to improvements in universal shaft couplings adapted for use in connecting two shafts not in alinement, such couplings being particularly well adapted for connecting the driving shafts of rolling mills with their respective variable distance roll necks for the purpose of rotating the rolls.

The main objects of my invention are:— First, to provide a universal shaft coupling simple in structure and easy to assemble and disassemble for renewal of wearing parts. Second, to provide a universal shaft coupling of great utility and economy with the necessary rigidity and the proper flexibility for efficient and practically noiseless operation. Third, to provide a universal shaft coupling with the proper means wherewith to maintain necessary and sufficient lubrication with maximum economy of lubricant, and coincident with this, extraneous matter is prevented from reaching the bearing parts and unnecessary wear thereby eliminated.

My invention consists essentially of a spindle coupling with transverse end projections more or less rounded in form and having two parallel centrally recessed plane faces, said projections acting as pivots about which the spindle may oscillate in a certain plane.

The coupling heads of the pinion shaft and roll shaft are preferably enlarged and each has a transverse cylindrical recess containing a central groove adapted to receive a corresponding cylindrical projection on the back of a slipper or bearing piece, the front face of which is substantially flat where it bears on the parallel plane faces of the ends of the spindle coupling.

I may prefer to use a liner fitting into the transverse cylindrical recess of the coupling heads, which liner is a sector of a hollow cylinder and has on its inner surface a central groove adapted to receive the cylindrical projection on the back of the slipper previously mentioned. In this case the central groove of the transverse cylindrical recess in the coupling head would be omitted and the liner suitably fastened to the coupling head.

Surrounding each end of the universal shaft coupling is a cylindrical and flanged coupling sleeve or muff having an annular groove next to the flange. The inner surface also has four longitudinal grooves spaced about ninety degrees apart. Directly in line with two of these diametrically opposite grooves are two cut out or notched portions in the flange, the latter being spanned by keepers, and on each side of each notch there is a bolt hole with a corresponding bolt hole in the keepers.

Four T-shaped notches in the side of the coupling head, spaced similarly to the bolt holes above mentioned, are pockets for T-headed bolts serving to maintain the assembly.

The result of this combination is to furnish a means whereby all lubricant is maintained in its proper place and to afford an easy and quick assembly or disassembly, at the same time supplying a practically noiseless and flexible universal shaft coupling free from lost motion.

Having thus given a general description of my invention, I will now, in order to make the matter more clear, refer to the annexed sheet of drawings, which forms part of this specification, and in which like characters refer to like parts.

Figure 1 is a side elevation of my improved universal shaft coupling, the left-hand coupling head being shown in a central vertical section and the right-hand coupling head being shown in elevation with the coupling sleeve in section; Fig. 2 is a side elevation of one of the coupling head connections showing one side of one of the coupling heads and sleeve in section, the head being turned at right angles to the position illustrated in Fig. 1; Fig. 3 is a vertical transverse section through one of the coupling heads taken on the line III—III of Fig. 1; Fig. 4 is a vertical sectional elevation through the spindle taken on the line IV—IV of Fig. 2; Fig. 5 is an inside end elevation of one of the coupling sleeves; Fig. 6 is an end elevation of the male end of the spindle coupling; Fig. 7 is an end elevation of the female end of one of the coupling heads; Fig. 8 is a detail illustrating the manner of attaching the coupling sleeve to the coupling head; Fig. 9 is a perspective view of one of the slippers; Fig. 10 illustrates in top plan a liner or bushing which I may use around the slippers; and Fig. 11 is a front elevation of the liner or bushing with slippers.

Referring now to the characters of reference on the drawings:—1 represents part of an adjustable or fixed roll, 2 the pinion, 3 neck of roll, 4 the neck of the pinion and 5 and 6 are bearing blocks under 3 and 4 respectively. 7 and 8 are respectively the coupling head of the roll and the pinion in each of which is shown the cylindrical recess 9. 10 is the central groove in 9 for receiving 12, the corresponding cylindrical projection on the back of the slipper 11, the front face of which is the bearing surface in contact with the centrally recessed parallel plane faces of 27, which are the flat ends of the spindle coupling.

The two cut out or notched portions 15 in the flange 14 are spanned by the two keepers 16, this construction together with the flange 14 serving to retain the lubricant. Four notches 17 in the side of each of the coupling heads 7 and 8 with the enlarged openings 18 serve as pockets to hold the T-heads of the bolts 19, said bolts passing through the bolt holes 23 in the flange 14 and the bolt holes in the keepers 16, thus holding the keepers 16 to the flanged coupling sleeves 14 and the latter to the coupling heads 7 and 8 when the nuts 24 are tightened. The tapered inner surface 20 of the coupling sleeve 13 serves to make a drawing fit on the coupling heads, the grooved out portions 21 of the tapered inner surface 20 of the coupling sleeve 13, allowing for clearance of the flat ends 27 of the spindle coupling 25, when assembling and also when in operation as the oscillatory motion takes place. The annular groove 22 in the coupling sleeve 13 together with the flanged edge 14 of the coupling sleeve and the keepers 16 retain and distribute the lubricant to the bearing surfaces.

The spindle coupling 25 has the upset or enlarged ends 26 and the flat ends of the spindle coupling 27 have two centrally recessed parallel plane bearing faces and other faces cylindrical for clearance as the oscillatory motion takes place.

I may prefer to use the following construction to replace in part what has heretofore been described:—

28 is a liner with the shape of a section of a hollow cylinder having in its inner surface a grooved central portion 29 to receive the cylindrical projection 12 on the back of the slipper 11. In case the liner 28 is used, the cylindrical recess 9 in the coupling heads 7 and 8 would be omitted and the liner 28 merely fitted into the cylindrical recess 9 in the coupling heads 7 and 8 and fastened thereto by the bolts through the holes 30 in the liner.

The object of this construction is that in case of any wear occurring it would come not on the coupling head but on the liner, a relatively economical piece to replace.

Although I have shown and described my invention in considerable detail, I do not wish to be limited to the exact and specific details thereof, as shown and described, but may use such modifications in, substitutions for, or equivalents thereof, as are embraced within the scope of my invention, or as pointed out in the claims.

Having thus described my invention, what I claim and desire to secure by Letters Patent is:—

1. In a universal shaft coupling, a shaft, a coupling head thereon provided with a transverse cylindrical recess, opposed slippers, each provided with a substantially plane face and an opposite face of convex cylindrical form adapted to slidably engage the interior surface of said recess, a second shaft provided with a flattened end adapted to slidably and pivotally engage said slippers between the plane faces thereof, a flanged cylindrical coupling sleeve secured to said coupling head thereby retaining the parts of the coupling, notches in the flange of said coupling sleeve, and keepers spanning said notches whereby said flange is adapted to retain lubricant.

2. In a universal shaft coupling, a rotatable driving element, coupling heads on the contiguous ends of said elements, a transverse cylindrical recess in each of said coupling heads, a pair of opposed slippers in each recess adapted to slidably engage the recess, a spindle provided with flattened ends adapted to slide between and pivot on the opposed faces of said slippers, a flanged cylindrical coupling sleeve secured to each coupling head and adapted to retain the parts of the coupling, notches in the flange of each coupling sleeve, and keepers adapted to span said notches whereby the flange is adapted to retain lubricant.

3. In a universal shaft coupling, a driving shaft, a driven shaft, coupling heads on the contiguous ends of said shafts, a transverse cylindrical recess in each of said coupling heads, opposed slippers, each provided with a substantially plane face and an opposite face of convex cylindrical form adapted to slidably engage the inner surface of the recesses in the coupling heads, a spindle provided with transverse end projections adapted to slide between and pivot on the opposed plane faces of said slippers, a flanged cylindrical coupling sleeve secured to each of said coupling heads and adapted to retain the parts of the coupling, notches in the flange of each coupling sleeve, and keepers spanning the notches whereby the flange is adapted to retain lubricant.

4. In a universal shaft coupling, a driving shaft, a coupling head thereon provided with a transverse cylindrical recess, a liner secured to the coupling head within said recess, opposed slippers, each provided with a substantially plane face and an opposite face of convex cylindrical form adapted to slidably engage the interior surface of said liner, a driven shaft, a transverse end projection thereon provided with opposed faces adapted to pivotally and slidably engage said slippers between the opposed plane faces thereof, a flanged cylindrical coupling sleeve secured to said coupling head and adapted to retain the parts of the coupling, notches in the flange of said coupling sleeve, and keepers adapted to span the notches whereby said flange is adapted to retain lubricant.

5. In a universal shaft coupling, a driving shaft, a driven shaft, coupling heads on the contiguous ends of said shafts, a transverse cylindrical recess in each coupling head, liners therein secured to the coupling head, opposed slippers, each provided with a substantially plane face and an opposite face of convex cylindrical form adapted to slidably engage the interior surface of said liners, a spindle, end projections thereon provided with opposed faces which are adapted to slidably and pivotally engage said slippers between the plane faces thereof, a flanged cylindrical coupling sleeve secured to each of said coupling heads and adapted to retain the parts of the coupling, notches in the flange of each of said coupling sleeves, and keepers spanning the notches whereby the flanges are adapted to retain lubricant.

In witness whereof I hereunto affix my signature.

HARRY R. GEER.